(12) United States Patent
Bisen et al.

(10) Patent No.: US 8,069,403 B2
(45) Date of Patent: Nov. 29, 2011

(54) MAJORITY VOTING LOGIC CIRCUIT FOR DUAL BUS WIDTH

(75) Inventors: Omprakash Bisen, Bangalore (IN);
Karthikeyan Ramamurthi, Bangalore (IN); Hima Bindu, Bangalore (IN)

(73) Assignee: SanDisk Technologies Inc., Plano, TX (US)

( * ) Notice: Subject to any disclaimer, the term of this patent is extended or adjusted under 35 U.S.C. 154(b) by 819 days.

(21) Appl. No.: 12/166,174

(22) Filed: Jul. 1, 2008

(65) Prior Publication Data
US 2010/0005373 A1 Jan. 7, 2010

(51) Int. Cl.
*H03M 7/00* (2006.01)
(52) U.S. Cl. ........................ 714/809; 714/811
(58) Field of Classification Search .................. 714/809, 714/811
See application file for complete search history.

(56) References Cited

U.S. PATENT DOCUMENTS

| | | | |
|---|---|---|---|
| 6,243,779 B1 * | 6/2001 | Devanney et al. | 710/305 |
| 6,489,900 B2 * | 12/2002 | Shin et al. | 341/50 |
| 6,553,445 B1 * | 4/2003 | Drapkin et al. | 710/305 |
| 6,584,572 B1 * | 6/2003 | Choi | 713/320 |
| 6,628,256 B2 * | 9/2003 | Nishimura | 345/96 |
| 6,708,277 B1 * | 3/2004 | Morris et al. | 713/300 |
| 6,732,214 B1 * | 5/2004 | Cohen et al. | 710/305 |
| 6,763,406 B1 * | 7/2004 | Devanney et al. | 710/65 |
| 6,788,222 B2 * | 9/2004 | Hall et al. | 341/50 |
| 6,877,050 B2 * | 4/2005 | Kanzaki et al. | 710/100 |
| 6,904,479 B2 * | 6/2005 | Hall et al. | 710/106 |
| 6,946,867 B2 * | 9/2005 | Naganawa | 326/27 |
| 7,061,408 B2 * | 6/2006 | Poechmueller | 341/55 |
| 7,139,852 B2 * | 11/2006 | LaBerge | 710/100 |
| 7,236,005 B1 | 6/2007 | Yee et al. | |
| 7,280,412 B2 * | 10/2007 | Jang et al. | 365/189.07 |
| 7,321,628 B2 * | 1/2008 | Kiehl | 375/259 |
| 7,400,541 B2 * | 7/2008 | Jang et al. | 365/189.07 |
| 7,405,981 B2 * | 7/2008 | Dietrich | 365/189.05 |
| 7,411,840 B2 * | 8/2008 | Gaskins et al. | 365/189.07 |
| 7,466,608 B2 * | 12/2008 | Park | 365/191 |
| 7,506,146 B2 * | 3/2009 | Joshi | 713/1 |
| 7,600,181 B2 * | 10/2009 | Alleyne et al. | 714/811 |
| 7,746,890 B2 * | 6/2010 | Park et al. | 370/463 |
| 2004/0068594 A1 | 4/2004 | Asaro et al. | |
| 2005/0188282 A1 | 8/2005 | Joshi | |

OTHER PUBLICATIONS

Stan et al., "Bus-Invert Coding for Low-Power I/O," *IEEE Transactions on Very Large Scale Integration (VLSI) Systems*, vol. 3, No. 1, Mar. 1995, pp. 49-58.
Chapter 8 Datapath Units: Multiplier Design, *Naitonal Taiwan University*, Jun. 12, 2002, access.ee.ntu.edu.tw/course/VLSI_design_90second/pdf/slide/Chap-8%20Multiplier%20(06-14-2002).ppt, pp. 1-25.

* cited by examiner

*Primary Examiner* — Stephen Baker
(74) *Attorney, Agent, or Firm* — Davis Wright Tremaine LLP

(57) ABSTRACT

A circuit is presented for determining whether or not to invert a bus, for example a data bus that is operable having multiple widths. The circuit includes comparison circuitry that can receive both the current and next values for the bus and individually compare the current and next values of the bits on the bus to determine whether these have changed. A voting circuit receives the result of these determinations and also receives an indication of width with which the bus is being operated. The voting circuit then determines a bus inversion values based upon whether the number of bits on the data that have changed exceed a value that depends upon the indication of bus width.

21 Claims, 3 Drawing Sheets

| ABC$_{in}$ | C$_{out}$ S | Numbers of 1's |
|---|---|---|
| 0 0 0 | 0   0 | 0 |
| 0 0 1 | 0   1 | 1 |
| 0 1 0 | 0   1 | 1 |
| 0 1 1 | 1   0 | 2 |
| 1 0 0 | 0   1 | 1 |
| 1 0 1 | 1   0 | 2 |
| 1 1 0 | 1   0 | 2 |
| 1 1 1 | 1   1 | 3 |
FIG. 3A
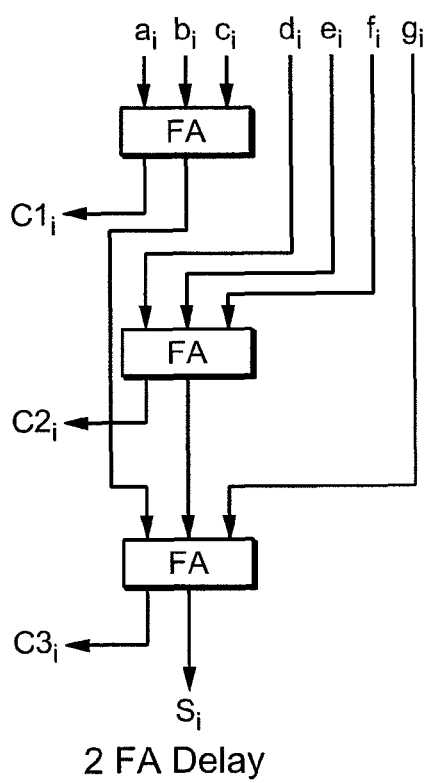
2 FA Delay
FIG. 3B
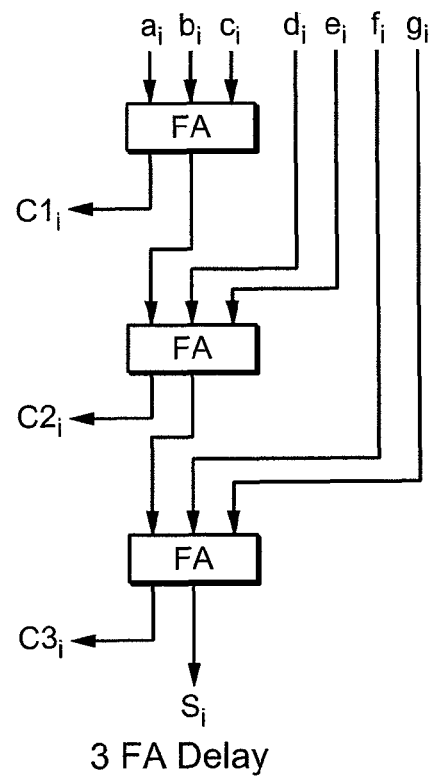
3 FA Delay
FIG. 3C

MAJORITY VOTING LOGIC CIRCUIT FOR DUAL BUS WIDTH

FIELD OF THE INVENTION

This invention pertains generally to the communications over a bus and, more particularly, to a majority voting logic circuit for dual bus width low power memory system.

BACKGROUND

In various computer and memory related devices, it is common for elements to be connected by one or more busses for the transfer of data and commands. For example, in a flash memory device, such as a memory card or USB memory drive, the device itself will communicate through an interface acting a bus and within the device itself its component elements will communicate with busses. Taking the flash memory system example, this will often have a controller and one or more memory chips connected by one or more busses. In many such devices, a bus (usually a data bus) will be operable in differing widths. Thus, in the case of flash memories, although historically these started out having an interface that could transmit 8 bits at a time (or "×8"), some manufactures have increased the bus width to 16 lines ("×16") for a higher data throughput. However, as some users will still only use a ×8 mode to reduce the number of lines routed between a memory and controller and save on the required board area, it can be useful to have system elements that function in both a ×8 and a ×16 mode.

In memory systems where power consumption is a concern, the technique of bus inversion is often employed. The power consumption depends upon the amount of transition for the bus lines: the greater the number of transitions, the more the power consumption. For example high to high, will consume less power than a transition from low to high or high to low. The idea of data inversion is to minimize the number of transitions in the bus, and the consequent power usage, by determining at each cycle whether to invert the data bus, along with an indication of this to the receiving end so that it knows to whether or not to re-invert data to be able to extract the correct content. This requires the system to determine for each transfer cycle whether or not to change the inversion of the bus, which can be accomplished by the process of "majority voting". Various techniques related to data bus inversion and majority voting can be found in references such as U.S. Pat. No. 7,236,005 and US patent applications numbers 20040068594 and 20050188282. However, the various prior art techniques make no allowance for consideration of multiple bus widths in the majority voting and bus inversion process.

SUMMARY OF THE INVENTION

A circuit is presented for determining whether or not to invert a bus, where the bus is operable having multiple widths. The circuit includes comparison circuitry that can receive both the current and next values for the bus and individually compare the current and next values of the bits on the bus to determine whether these have changed. A voting circuit receives the result of these determinations and also receives an indication of width with which the bus is being operated. The voting circuit then determines a bus inversion values based upon whether the number of bits on the data that have changed exceed a value that depends upon the indication of bus width.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which:

FIGS. 3A, 3B, and 3C provide some background on full adders.

DETAILED DESCRIPTION

The techniques presented here address the problem of enabling a majority voting logic scheme that can be used to achieve low power consumption by minimizing the switching power of a bus by minimizing the number of signal transitions through data bus inversion, while supporting multiple bus widths. Although these techniques can be used with any memory product that supports dual bus width and desires to minimize the power consumption in transfers, the exemplary embodiment is for a bus to transfer data between the memory and the controller of a flash memory system. The exemplary embodiment supports both ×16 and ×8 bus widths of the memory system.

Figure 1:
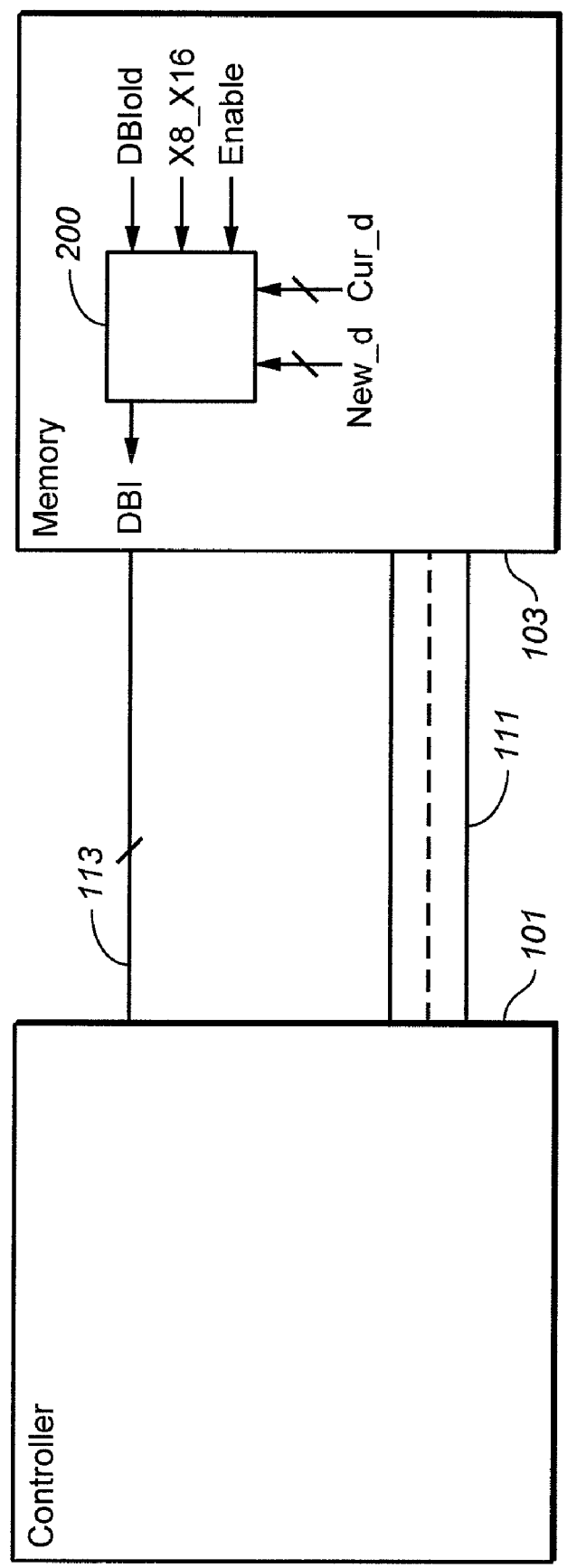
FIG. 1 shows a memory device in which the exemplary embodiment is presented.

FIG. 1 shows the flash memory system of the exemplary embodiment. This has a controller chip 101 and a memory chip 103. In this case the controller is part of the memory device and mediates the transfer of data between a host (not shown here) and the memory chip 103 as well as managing the storage of data on the memory. In other cases the controller function is executed on the host. The controller and memory communicate through a data bus 111 and various control lines 113, which although shown separate here may be combined as a unified data-command bus in some embodiments. More detail for various examples of non-volatile memory systems to which the various techniques presented here can be applied can be found in U.S. patent application Ser. No. 11/759,909, for example.

The broken line down the middle of the bus 111 indicates schematically the two widths of the different modes in which the bus can be used. In this embodiment, the memory 103 is operable in either of the two width modes for data transfer and element 200 within the memory is used when the controller is reading from the memory. The indication of whether or not the data is inverted can be send to the controller along one of the control lines of 113. This could be a dedicated line or other line that is available; for example, since a write enable pin of the memory chip would otherwise be idle when the controller is reading out data from the memory, it could used to carry the data bus invert signal.

Figure 2:
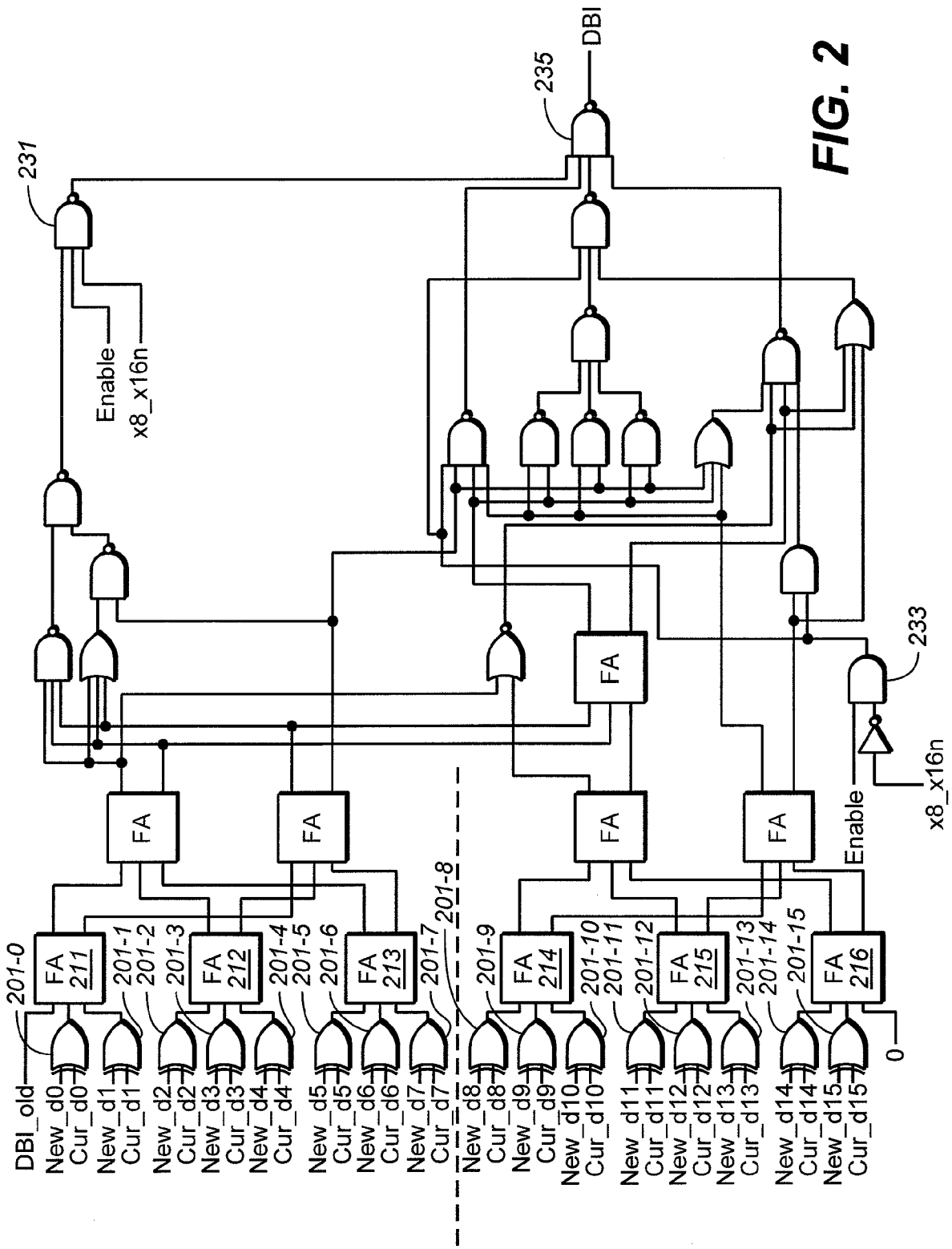
FIG. 2 is an exemplary embodiment of the majority voting logic supporting multiple widths.

FIG. 2 illustrates an exemplary embodiment for the majority voting logic circuit 200 from FIG. 1 that supports dual bus widths. On the right hand side, both the current (Cur_di) and the new data values (New_di) for each of the data lines on the bus are compared, where in the example i=0-15. These are compared by supply each of the new and current values to an XOR gate 201-*i*. Consequently, the output of each of the 201-*i* will be 1 only if the value on the line i changes value. The majority voting circuit then determines whether or not a majority of these values have changed and then determine the data bus inversion (DBI) output based on this. To accomplish this, the outputs of the 201-*i* are supplied to the array of full adder (FA) circuits 211-216 and on to the rest of the circuit for the determination of DBI from the final gate 235. Having both the new and current data values available as input can be accomplished in a number of ways, either by taking these at different places in the memory circuitry that differ by a cycle or just keeping the new value from one cycle and running it back in as the current value after introducing a one cycle delay.

The exemplary embodiment has two widths of 8 and 16 and, consequently, there may be ties where half the values change. In the exemplary embodiment, the DBI output for the last cycle (DBI_old) is also supplied as an input to FA 211. This way, should there be a tie, the value of DBI will stay the same. The DBI_old value can either be read back to the circuit at FA 211, or the current DBI value can just be looped back from the output of gate 235 after introducing a one cycle delay. This has the advantage that, since the same number of data lines will both high and low, that DBI can be kept the same (DBI=DBI_old) to save on power switching the DBI line and also save on switching the circuitry that would invert or not invert the data on arrival at the other end of the bus. Any left over inputs to the first column of full adders is then set to 0, so as to not affect the outcome of the voting, as is done with the bottom input of FA 216.

The circuit of FIG. 2 also supports bus width of 8 bits (×8) and of 16 bits (×16). In the ×8 case, the inputs to be considered are the new and current values of d0-d7, with d8-d15 below the dotted line being ignored; while in the ×16 case all of d0-d15 need to be considered. This is effected by the ×8_×16 n input, the select signal for bus width: when =1 bus width is 8 and when =0 bus width is 16. The ×8_×16 n input is supplied at the gate 231 and, in inverted form, at the gate 233, with the result that the output of the XORs 201-8 to 201-15 are disregarded when DBI is determined. Also, what constitutes a majority changes depending upon the number of inputs being considered. In addition to ignoring d8-d15, the ×8_×16 n value also adjusts the definition of majority accordingly.

The gates 231 and 233 also have the enable signal for the majority voting circuit (Enable) as input. When Enable is low, DBI will be 0. Note that in addition to disabling the circuit, this also allows the line that would normally carry DBI to be used for another purpose, such as the write enable signal, thereby saving on pin count.

Thus, based on the inputs of New_d, Cur_d, DBI_old, ×8_×16 n, and the Enable signal, the majority logic circuit outputs DBI. If current data and New data has transitions more than half (4 in case of ×8 and 8 in case of ×16) then DBI is set='1'. If current data and New data has transitions less than half (4 in case of ×8 and 8 in case of ×16) then DBI is set='0'. If current data has exactly half transitions, then DBI=DBI_old. (Although the determination here is based upon half the bits changing, other values can be used if desired.)

It should again be noted that FIG. 2 is an exemplary embodiment. More generally, it will be understood that the specific arrangements of the various logic gates shown there are just one example and that others can provide the same function. The adder functions can also implemented in various ways. Considering the adders, their basis function is to act as counters of the number of "1"s at the inputs: if A, B and C are the inputs, a full adder encodes these on its SUM (top) and CARRY (bottom) outputs with the values shown in FIG. 3A. Thus, A 1-bit full adder (FA) provides a 3:2 compression in the numbers or bits. Further, when there are more than three inputs, multiple full adders can combine these is various manners. This is shown in FIGS. 3B and 3C for 7 inputs (a-g) to provide a 7:4 compression by way of 3 full adders having a delay of either 2 FAs (FIG. 3B) or 3 FAs (FIG. 3C). More detail on adders can be found, for example, in Mircea R. Stan and Wayne P. Burleson, "Bus-Invert Coding for Low-Power I/O", *IEEE Transaction on very large scale integration (VLSI) systems*, VOL. 3, No. 1, MARCH 1985.

Additionally, although the techniques presented here have been described primarily in the context of a data bus between the controller and memory of a flash memory system where the bus can have two specific widths (×8, ×16), it is more generally applicable. It can be used with any product that supports multiple bus widths, whether a data bus or other bus, and need to minimize the power consumption in the transfer of content over the bus. The design can also be scaled to more than two different bus widths and to widths other than just 8 or 16 bits.

The arrangement presented here has a number of advantages over previous techniques. As already discussed, it supports multiple width modes and, in the exemplary embodiment, maintains the value of DBI if the number of data line transitions is a tie. Further, having a single majority voting logic circuit that handles multiple bus widths saves on die array and circuit delay relative to introducing separate circuits for each bus size. Also by using a digital implementation, as opposed to the sort of analog implementations found in the prior art, the circuit ensures the robustness of the sense amplifier and does not require the highly specific structures (such as long channel transistors) or tolerances (such as well matched transistors) of previous approaches.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A circuit to determine whether to invert a bus, where the bus is operable having a plurality of widths, comprising:
   comparison circuitry connectable to receive a current value for the bits of the bus and a next value for the bits of the bus and individually compare the current and new values for each of said bits of the data bus to determine whether the value of said bits has changed; and
   a voting circuit connected to the comparison circuitry to receive the results of the individual comparisons and to receive an indication of the width for which the bus is being operated, wherein the majority voting circuit determines a bus inversion value based upon whether the number of bits that have changed value is greater than a value dependent upon said indication of the bus width.

2. The circuit of claim 1, wherein the voting circuit is further connected to receive an enable signal by which the output of the voting circuit can be enabled and disabled.

3. The circuit of claim 1, wherein said bus is a data bus.

4. The circuit of claim 1, wherein said circuit is formed on a memory chip.

5. The circuit of claim 1, where said comparison circuitry comprises a plurality of exclusive OR gates each having as input the current value of one bit of the bus and the new value of the same bit of the bus.

6. The circuit of claim 1, wherein the bus is operable in a first width of 8 bits and a second width of 16 bits.

7. The circuit of claim 1, wherein the bus inversion value is high when a majority of the bits have changed value.

8. The circuit of claim 7, wherein the voting circuit is further connected to receive the current bus inversion value and wherein in response to the number of bits that have changed value being equal to the number of bits that have not changed value, the determined bus inversion value is same as the current bus inversion value.

9. A memory chip that can transfer data between itself and another device on a bus of a plurality of widths, including:
a memory array;
peripheral circuitry to determine data content from the memory array and transfer the data content onto the bus, including a circuit for determining whether to invert the bus, comprising:
comparison circuitry connectable to receive a current value for the bits of the bus and a next value for the bits of the bus and individually compare the current and new values for each of said bits of the data bus to determine whether the value of said bits has changed; and
a voting circuit connected to the comparison circuitry to receive the results of the individual comparisons and to receive an indication of the width for which the bus is being operated, wherein the majority voting circuit determines a bus inversion value based upon whether the number of bits that have changed value is greater than a value dependent upon said indication of the bus width.

10. The memory chip of claim 9, wherein the voting circuit is further connected to receive an enable signal by which the output of the voting circuit can be enabled and disabled.

11. The memory chip of claim 9, where said comparison circuitry comprises a plurality of exclusive OR gates each having as input the current value of one bit of the bus and the new value of the same bit of the bus.

12. The memory chip of claim 9, wherein the bus is operable in a first width of 8 bits and a second width of 16 bits.

13. The memory chip of claim 9, wherein the bus inversion value is high when a majority of the bits have changed value.

14. The memory chip of claim 13, wherein the voting circuit is further connected to receive the current bus inversion value and wherein in response to the number of bits that have changed value being equal to the number of bits that have not changed value, the determined bus inversion value is same as the current bus inversion value.

15. A method for determining whether to invert a bus, where the bus is operable having a plurality of widths, the method comprising:
receiving a current value for the bits of the bus;
receiving a next value for the bits of the bus;
receiving an indication of the width for which the bus is being operated;
individually comparing the current and new values for each of said bits of the data bus to determine whether the value of said bits has changed; and
determining a bus inversion value based upon whether the number of bits that have changed value is greater than a value dependent upon said indication of the bus width.

16. The method of claim 15, further comprising:
receiving an enable signal whereby the circuitry determining the bus inversion value can be enabled and disabled.

17. The method of claim 15, wherein said bus is a data bus.

18. The method of claim 15, wherein said individually comparing the current and new values for each of said bits of the data bus includes providing the current and new values for each of said bits of the data bus to a plurality of exclusive OR gates each having as input the current value of one bit of the bus and the new value of the same bit of the bus.

19. The method of claim 15, wherein the bus is operable in a first width of 8 bits and a second width of 16 bits.

20. The method of claim 15, wherein the bus inversion value is high when a majority of the bits have changed value.

21. The method of claim 20, further comprising:
receiving the current bus inversion value, wherein in response to the number of bits that have changed value being equal to the number of bits that have not changed value, the determined bus inversion value is same as the current bus inversion value.

* * * * *